(12) United States Patent
Suisa

(10) Patent No.: US 7,120,798 B2
(45) Date of Patent: Oct. 10, 2006

(54) SYSTEM AND METHOD FOR THE GENERATION AND VERIFICATION OF SIGNATURES ASSOCIATED WITH HARDCOPY DOCUMENTS

(76) Inventor: Daniel Suisa, Jl. Walet Permai 4/33, Jakarta, 14470 (ID)

(*) Notice: Subject to any disclaimer, the term of this patent is extended or adjusted under 35 U.S.C. 154(b) by 630 days.

(21) Appl. No.: 10/604,885

(22) Filed: Aug. 25, 2003

(65) Prior Publication Data

US 2005/0049977 A1    Mar. 3, 2005

(51) Int. Cl.
*H04L 9/00* (2006.01)

(52) U.S. Cl. .................. 713/176; 705/50; 705/64; 705/76; 380/277; 380/278; 380/279; 380/281; 380/282; 380/285; 380/44; 380/47; 726/17; 726/21; 713/150; 713/175

(58) Field of Classification Search .......... 705/50–79; 380/277–279, 281–285, 44, 47; 726/17, 726/21; 713/150, 175
See application file for complete search history.

(56) References Cited

U.S. PATENT DOCUMENTS

| | | | |
|---|---|---|---|
| 6,081,610 A * | 6/2000 | Dwork et al. | 382/119 |
| 2002/0122568 A1 * | 9/2002 | Zhao | 382/100 |
| 2002/0152164 A1 | 10/2002 | Dutta et al. | 705/43 |

FOREIGN PATENT DOCUMENTS

WO    WO 97/26618    *  7/1997

OTHER PUBLICATIONS

"Device ot Detect Fraudulent Cheque Signatures Developed", August 23, 1990.*

* cited by examiner

*Primary Examiner*—James P. Trammell
*Assistant Examiner*—Jalatee Worjloh
(74) *Attorney, Agent, or Firm*—Marc Bobys

(57) ABSTRACT

A system generates and verifies signatures on hardcopy documents. A signor key is associated with a signor of a hardcopy document. A document signature is generated using the signor key to encode data selected from document data required to be on the hardcopy document. The document signature is then associated with the hardcopy document. A data indicator is also associated with the hardcopy document and indicates which of the document data is used to generate the document signature. A verification section receives the hardcopy document having the document data thereon, and also receives the document signature and the associated data indicator. The verification section performs a comparison to determine whether the document signature was generated using the signor key and the document data indicated by the data indicator. An output section outputs an indication, based on the results of the comparison, of whether the document signature was generated using the signor key and the document data indicated by the data indicator.

42 Claims, 11 Drawing Sheets

FIG. 6A

Check no. 234567

Date _____

Pay _____ or bearer

Dollars _____ $ _____

```
┌─────────────────────────────────────┐
│                                     │
│         Affix the data here         │
│                                     │
└─────────────────────────────────────┘
```
612

234567  123456789  1234567890  (Magnetic Ink Character Line)

Check no. 234567

Date _____

Pay _*Payee Name*_____ or bearer

Dollars _____ $ _____

```
┌─────────────────────────────────────┐
│ By 9 July 2003; pay to the name mentioned above; │
│ the sum of $10,000,000.00 (ten million dollars); │
│ signed by Drawer Name:83919178903   │
└─────────────────────────────────────┘
```
613

234567  123456789  1234567890  (Magnetic Ink Character Line)

Date _____          Check no. 345678

Pay _____ or bearer

Dollars _____ $ _____

Signature _____

123456789  1234567890 345678 (Magnetic Ink Character Line)

Date 7 October 2003          Check no. 345678

Pay Daniel Suisa _____ or bearer

Dollars One hundred million only _____ $ 100,000,000.00

Signature 83190567197

123456789  1234567890 345678 (Magnetic Ink Character Line)

SYSTEM AND METHOD FOR THE GENERATION AND VERIFICATION OF SIGNATURES ASSOCIATED WITH HARDCOPY DOCUMENTS

BACKGROUND OF INVENTION

The invention relates to the field of signature verification on documents, and more specifically to the creation and use of digital signatures on hardcopy documents.

The processing of hardcopy documents, such as paper checks (cheques), having human handwritten signatures is a time-consuming and labor-intensive task. The accurate processing of large numbers of documents for signature verification is often required but difficult to achieve. Banks are under severe time pressure to process a massive volume of checks everyday. Moreover, the variations of a person's signature, the changes of the signature of a person due to aging and the differences of styles of signatures among people from different cultures and different parts of the world such as Chinese style, English style, etc., add complexity to the task.

Even the modern-day computerized systems with artificial intelligence/pattern recognition capabilities encounter major challenges in making a decision when verifying a human signature since many different parameters and factors are used.

A number of proposals have been set forth to substitute electronic checks for paper checks in order to escape from the time consuming and costly processing of paper checks. However, paper checks have been used for a long time, and will likely remain a preferred payment instrument for many years to come.

The inadequacy of prior-art methods and systems for handling paper checks also results in a large number of fraudulent checks being honored, causing a huge financial loss everyday.

In order to solve the problem of fraudulent checks and other documents, it is not enough to verify that a signature on a particular document is authentic. Using modern technology is becoming easier and easier to exactly copy a signature from one document to another. It is therefore helpful to produce a signature that is unique to the signor as well as to document upon which it is written. In this way, it can easily be determined when a signature that has been written for one document has been forged onto another document, even if the signature appears exactly the same as on the original document.

U.S. Pat. No. 6,081,610 to Dwork et al. (Dwork) teaches a system and method for verifying signatures on documents. Dwork generates a digital signature on a hardcopy document using a private key along with data pertaining to the document itself consisting of a scanned bitmap of the document. However, Dwork is inefficient because the signature contains an entire bitmap of the hardcopy document and thus requires a large amount of data. Moreover, Dwork is limited since all data required to be written on the check must be written before generating the digital signature. There is no provision for allowing some extra information to be added to the check between generating the digital signature and verifying the document.

Also, Dwork's signature device includes or must be attached to a bulky scanner, reducing the device's portability. The large amount of data contained in the signature requires a great deal of processing and storage within the signature device. The large amount of data contained in the signature additionally wastes bandwidth when the signature is transmitted for verification.

It is an object of the present invention to provide an apparatus and method for the generation and verification of signatures which identify the signor as well as the document with which they are associated. It is an additional object of the present invention to provide a system and method for quickly and accurately generating and verifying signatures associated with hardcopy documents using data selected from data required to be on the document. A further object of the present invention is to allow the addition of data on the document between the steps for generating the signature and the steps for verifying the signature associated with the document.

SUMMARY OF INVENTION

These and other objects are provided by the present invention which provides a system and method for quickly and accurately generating and verifying signatures associated with hardcopy documents. The present invention generates a digital signature for a hardcopy document using specified document data required to be on the document. It can be determined that the signature is unique to the signor by virtue of its encoding using an encryption key associated with the signor, and also unique to the document, by virtue of it being based on the recognition of document data read from the document.

In general terms the invention generates and verifies signatures on hardcopy documents. A signor key is associated with a signor of a hardcopy document. A document signature is generated using the signor key to encode data selected from document data required to be on the hardcopy document. The document signature is then associated with the hardcopy document. A data indicator is also associated with the hardcopy document and indicates which of the document data is used to generate the document signature. A verification section receives the hardcopy document having the document data thereon, and also receives the document signature and the associated data indicator. The verification section performs a comparison to determine whether the document signature was generated using the signor key and the document data indicated by the data indicator. An output section outputs an indication, based on the results of the comparison, of whether the document signature was generated using the signor key and the document data indicated by the data indicator.

The invention is practical and compact enough to allow a customer to generate and apply a signature to a document such as a check while on the go, while also allowing automatic verification of the signed documents using a computer-based verification system.

BRIEF DESCRIPTION OF DRAWINGS

Further preferred features of the invention will now be described for the sake of example only with reference to the following figures, in which:

FIGS. 5–7 show various types of checks before and after being filled in using some of the embodiments of the present invention.

DETAILED DESCRIPTION

Figure 9A:
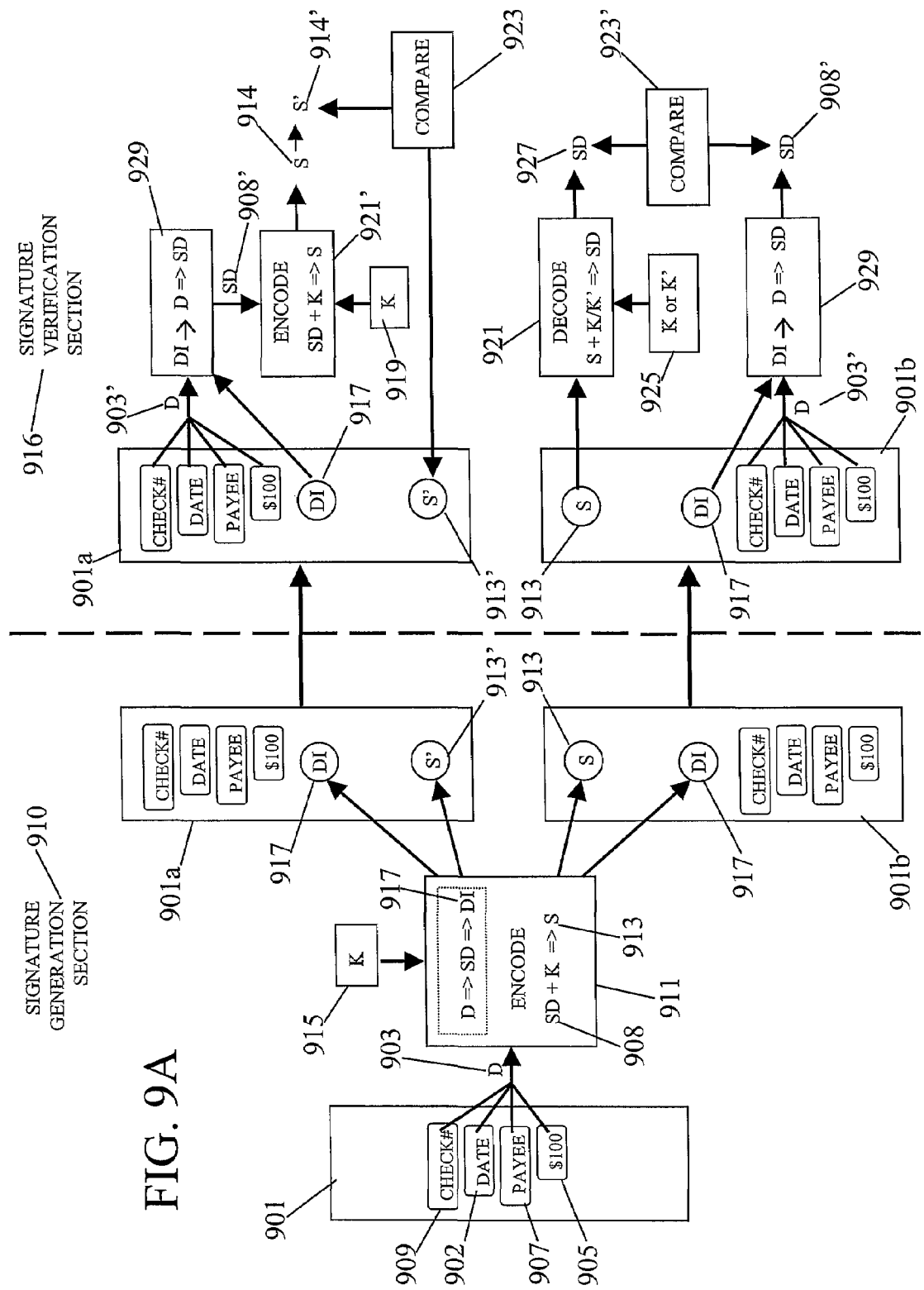
FIGS. 9A–C are diagrammatic views of several embodiments of the present invention.

The invention is described in general first with reference to FIG. 9A. A hardcopy document 901, such as a check, has document data 903 (represented by "D" in the figure) written on it. The document data, in the case of a check, can be a check date 902, a check amount 905, a payee name 907 and a check identification number 909, for example.

A signature generation part 911 of a signature generation section 910 acquires (for example by optical character recognition or manual input) the document data "D" 903 from the hardcopy document 901 and the acquired document data "D" 903 is selected to produce selected document data "SD" 908. The selected document data "SD" 908 can be the same as or a subset of the document data "D" 903. A data indicator "DI" 917 indicating which of the document data is used to generate a document signature 913 is also generated. The generation part 911 next generates the document signature 913 using a signor key 915 associated with a signor of the hardcopy document 901 to encode the selected document data 908.

The data indicator 917 and document signature 913 are then placed on the hardcopy document 901 as indicated by the hardcopy documents 901a and 901b. Other document data can also be added to the hardcopy document 901. As shown in the figure, the hardcopy document 901a can have a document signature S' 913' placed on it. Here S' can include the entire generated document signature or just a portion of the document signature. Using just a portion of the signature has the advantage of saving processing time and making it easier and faster to place the document signature on the hardcopy document 901, especially when the signature is to be written on the hardcopy document 901 manually. The document signature S 913 shown on the hardcopy document 901b, on the other hand, is the entire generated document signature.

In one embodiment, the hardcopy document 901a is sent to a verification section 916. A document data selection part 929 uses the data indicator 917 read from the document 901a to select the document data 903' to produce selected document data 908'. The selected document data 908' is encoded by an encoding section 921'. The encoding section 921' has a verification key 919 corresponding to and substantially identical to the signor key 915. The verification key 919 is used to encode the selected document data 908' to produce an entire generated verification signature S 914. Also, a verification signature S' 914' can be produced which can include the entire generated verification signature or just a portion of the verification signature. A comparison part 923 compares the verification signature S' 914'to the document signature S' 913' on the document 901a, and if they are substantially the same then the document signature S' 913' was generated using the authentic signor key 915 and the selected document data 908', which is the document data 903 indicated by the data indicator 917. Therefore, the document 901a is authenticated using the results of the comparison. In this embodiment a symmetric cryptosystem such as DES can be used to encode the selected document data 908, 908' to produce the signatures 913', 914', respectively.

In another embodiment, the signature 913 placed on the document 901 must be substantially identical to the signature 913 generated by the signature generation part 911 as shown by the hardcopy document 901b in FIG. 9A. The abbreviated signature of the previous embodiment should not be used. The hardcopy document 901b is sent to the verification section 916. A decoding section 921 has a verification key K or K' 925. The document signature 913 is decoded using the verification key K or K' 925 to produce recovered selected document data 927. The verification key K 925 can be the same as the signor key 915 as is the verification key K 919 in the previous embodiment, or can be different from the signor key 915 in which case it is referred to as verification key K' 925.

In this embodiment either a symmetric or an asymmetric cryptosystem can be used. When a symmetric cryptosystem such as DES is used, the signor key K 915 and verification key K 925 are substantially the same, and the selected document data 908 and 908' can be encoded and recovered using the same key. When an asymmetric cryptosystem such as RSA is used, the signor key K 915 and verification key K' 925 are different, but related to one another. In this case the signor key K 915 can be regarded as a private key and the verification key K' 925 can be regarded as a public key. The signor key 915 can be used to encode the selected document data 908 to produce the document signature 913 and the verification key K' 925 can be used to decode the document signature 913 to recover the selected document data 927. Also, the document data selection part 929 uses the data indicator 917 acquired from the document 901b to select the document data 903' to produce the selected document data 908'. A comparison part 923' compares the recovered document data 927 to the selected document data 908'. If the comparison shows that the recovered document data 927 is substantially the same as the selected document data 908', then the document signature S 913 was generated using the authentic signor key 915 and the selected document data 908, which is the document data 903 indicated by the data indicator 917. Therefore, the document 901b is authenticated using the results of the comparison.

Figure 9B:
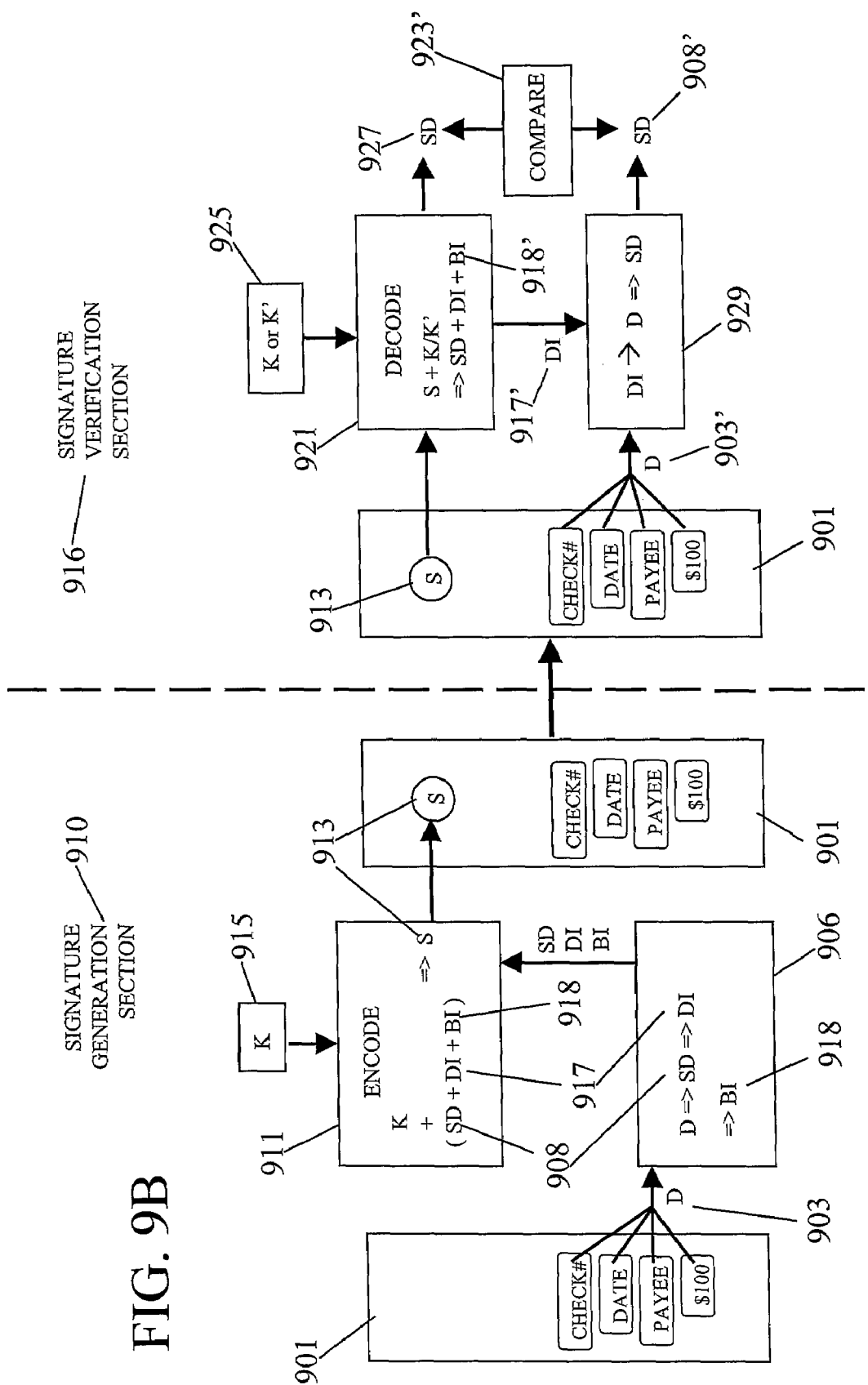

FIG. 9B illustrates another embodiment of the present invention for use with the embodiment of FIG. 9A. Here, a bearer indicator "BI" 918 is defined to indicate whether or not the bearer of the check, who is not the payee, is allowed to clear the check. A data selection part 906 acquires the document data "D" 903 and the acquired document data "D" 903 is selected to produce the selected document data 908. The data indicator "DI" 917 is also produced to indicate the selected data 908 that will be used to generate a document signature. The bearer indicator 918, along with the data indicator "DI" 917 and selected document data 908 are passed to the signature generation part 911. The signature generation part 911 generates a document signature 913 using a signor key 915 associated with a signor of the hardcopy document 901 to encode the selected document data "SD" 908, combined with the data indicator "DI" 917 and the bearer indicator "BI" 918.

The document signature 913, which is encoded from the combination of selected document data 908, data indicator 917 and bearer indicator 918 is placed on the hardcopy document 901. In this embodiment, the data indicator 917 and the bearer indictor 918 are contained in the signature 913.

The verification section 916 receives the document 901 and acquires the document signature 913. The decoding section 921 decodes the acquired document signature 913 using the verification key K or K' 925 to recover the selected document data "SD" 927, a data indicator "DI" 917' and a bearer indicator 918'. The bearer indicator 918' can be used to determine whether or not to allow the bearer, if not the payee, to clear the check (document 901). The data indicator "DI" 917' is further used by a verification part 929 to select the document data 903' to produce the selected document data 908'. A comparison part 923' then compares the recovered document data 927 to the selected document data 908' as with the comparison part 923' of FIG. 9A.

Figure 9C:
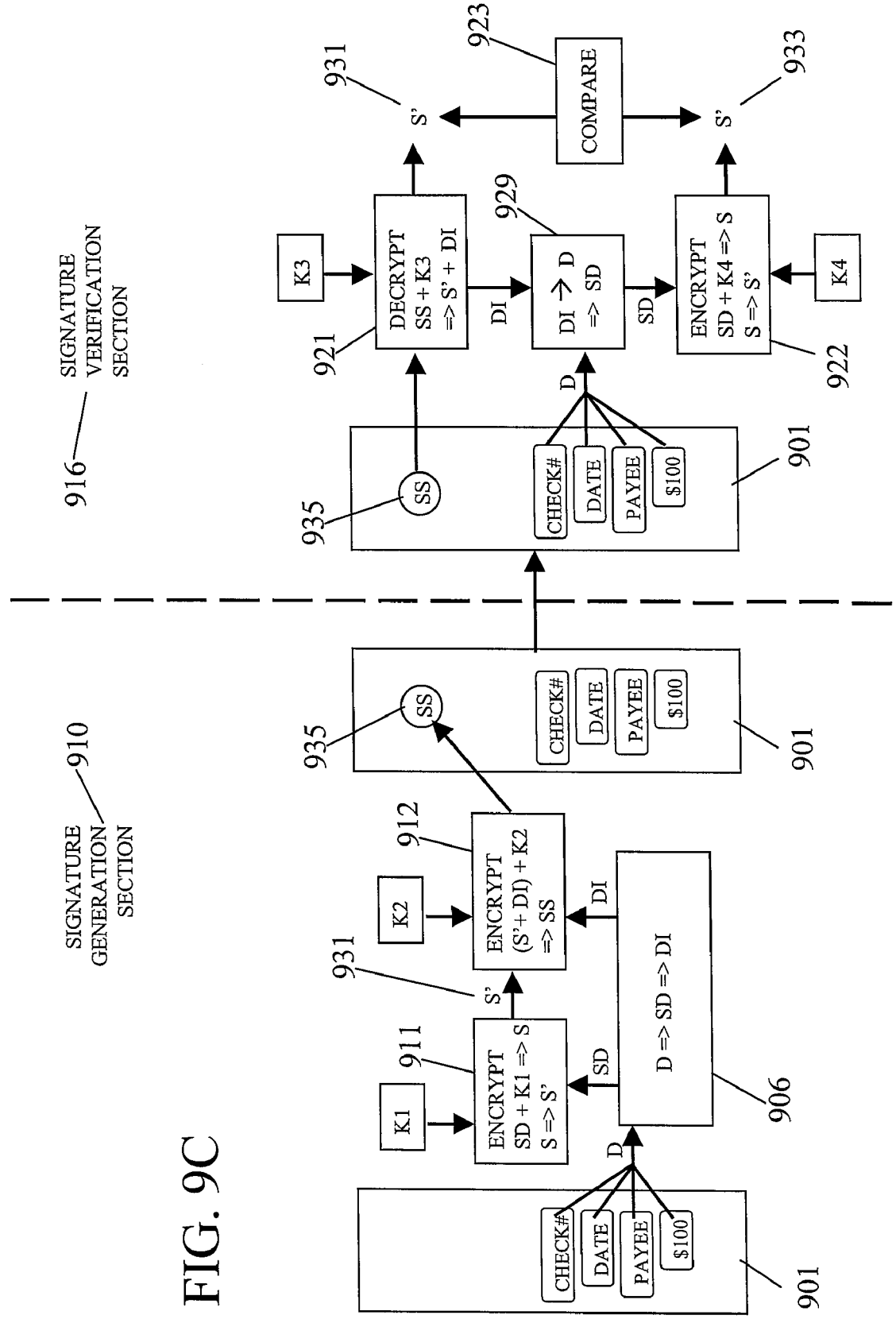

FIG. 9C illustrates another embodiment for use with the embodiments of FIG. 9A. In this embodiment, both the DES and RSA algorithms can be used together, wherein in such a case, a signor key "K1" and a verification key "K4" are identical for use with DES, and a signor key "K2" can be the signor's private key and a verification key "K3" can be signor's public key for use with RSA. The signor keys "K1" and "K2" can be stored in the signature apparatus and the verification keys "K3" and "K4" can be stored in a database of the verification apparatus, or alternatively, the key "K4", if it is a public key, can be obtained from an external source. Combinations of cryptosystems other than the above can be used as well.

Describing this embodiment in more detail, the data selection part 906 of signature generation section 910 acquires the document data "D" from the hardcopy document 901 and the selection of the document data "D" produces the selected document data "SD", and the data indicator "DI". The selected document data "SD" is output to the signature generation part 911 while the data indicator "DI" is output to a second signature generation part 912. The signature generation part 911 encrypts the acquired selected document data "SD" using the signor key "K1" to produce an intermediate signature "S". An intermediate signature S' 931 can also be produced wherein S' can be the same as or a portion of "S". The second signature generation part 912 acquires the intermediate signature S' from the signature generation part 911. The second signature generation part 912 encrypts the acquired intermediate signature S' and the data indicator "DI" using the signor key "K2" to produce a document signature "SS" 935.

The resulting document signature "SS" 935 is then placed on the hardcopy document 901. In this embodiment the data indicator "DI" is already contained within the document signature "SS" 935.

The verification section 916 receives the document 901. The decoding section 921 acquires the document signature "SS" 935 from the received document 901 and decrypts the acquired document signature "SS" 935 using the verification key "K3" to recover the intermediate signature S' 931 and the data indicator "DI". The document data selection part 929 uses the data indicator "DI" from the decoding section 921 to select the document data "D" acquired from the received document 901 to produce selected document data "SD". Next, an encoding section 922 encrypts the selected document data "SD" acquired from the document data selection part 929 using the verification key "K4" to produce the intermediate signature "S" and then the intermediate signature S', wherein S' can be the same as or a portion of "S". The comparison part 923 then compares the intermediate signature S' 931 to the intermediate signature 933 as in FIG. 9A.

Figure 1:
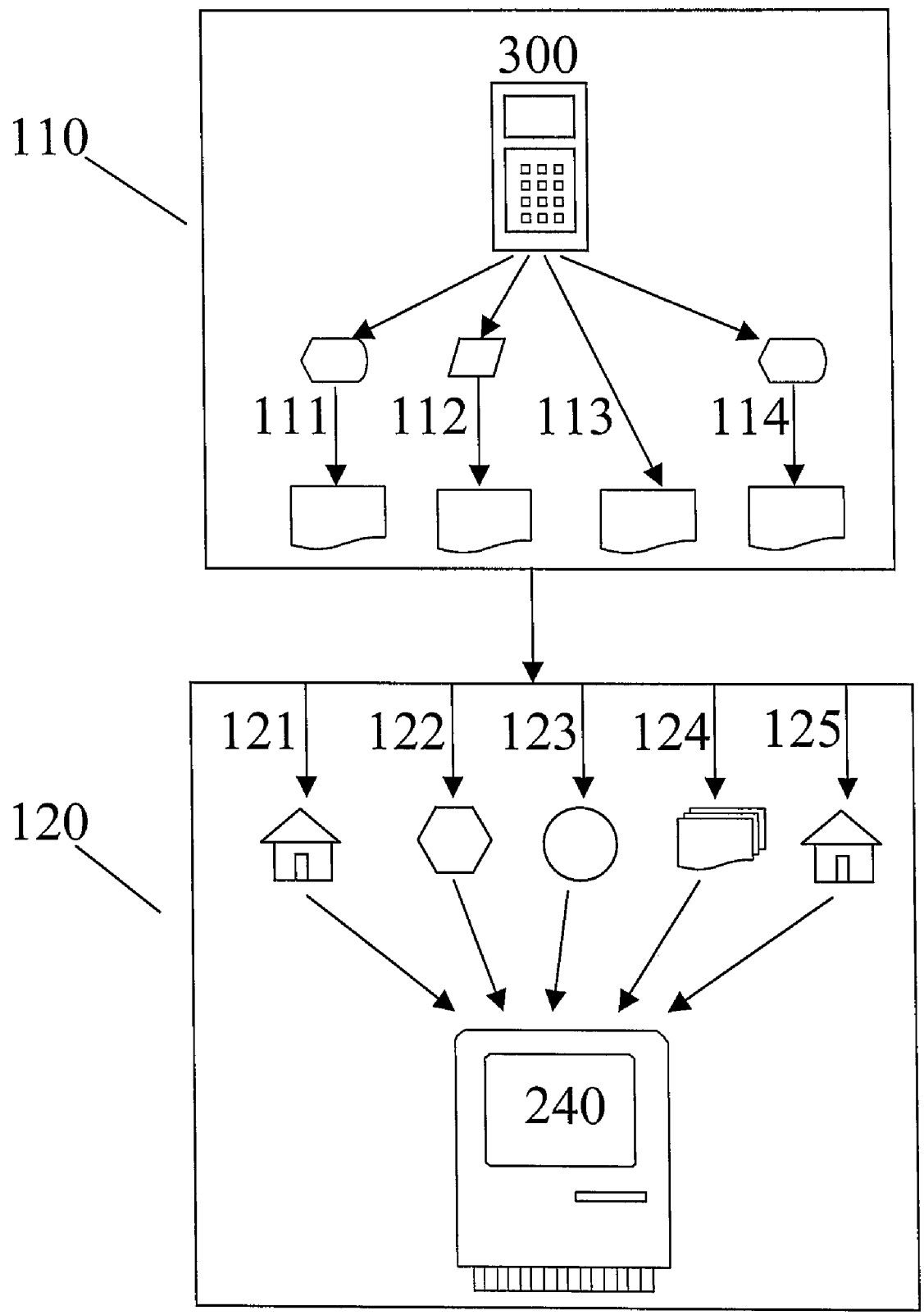
FIG. 1 illustrates several different examples of signature generation and association steps and verification steps for implementing the verification of signatures on checks of the present invention.
Figure 2:
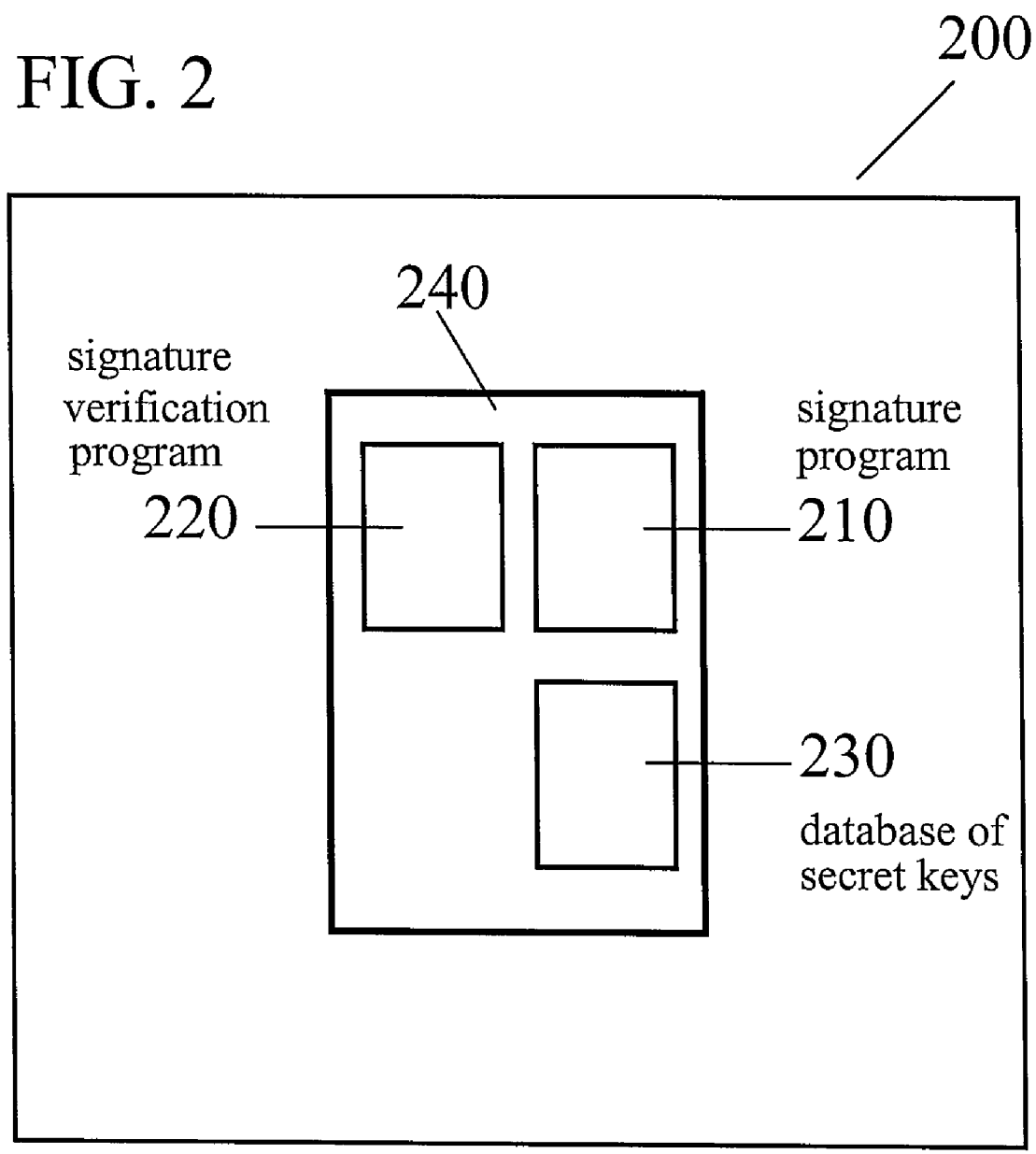
FIG. 2 is a diagrammatic view of the verification apparatus for implementing the verification steps of FIG. 1.
Figure 3:
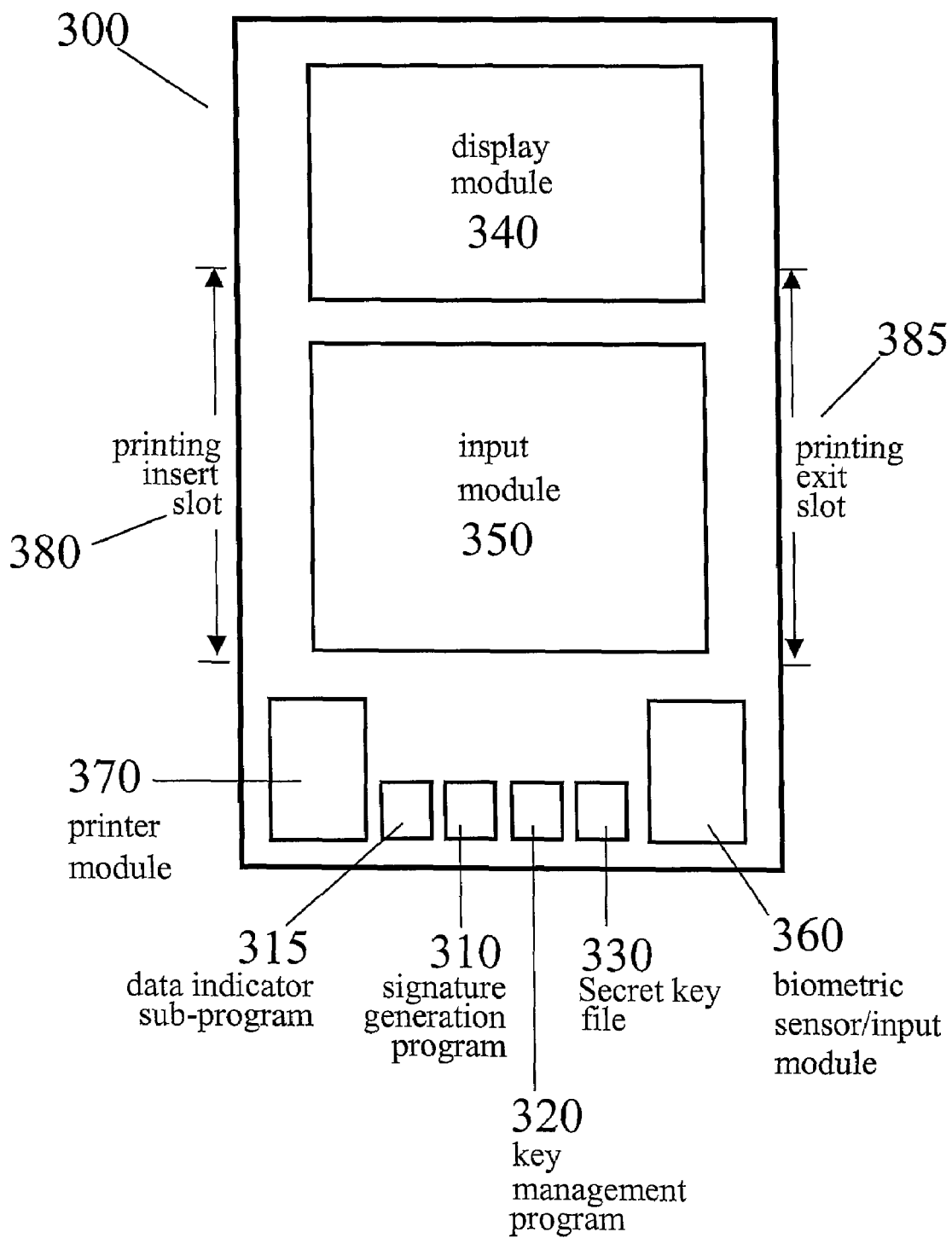
FIG. 3 is a diagrammatic view of the signature apparatus for implementing the signature generation and association steps of FIG. 1.
Figure 4:
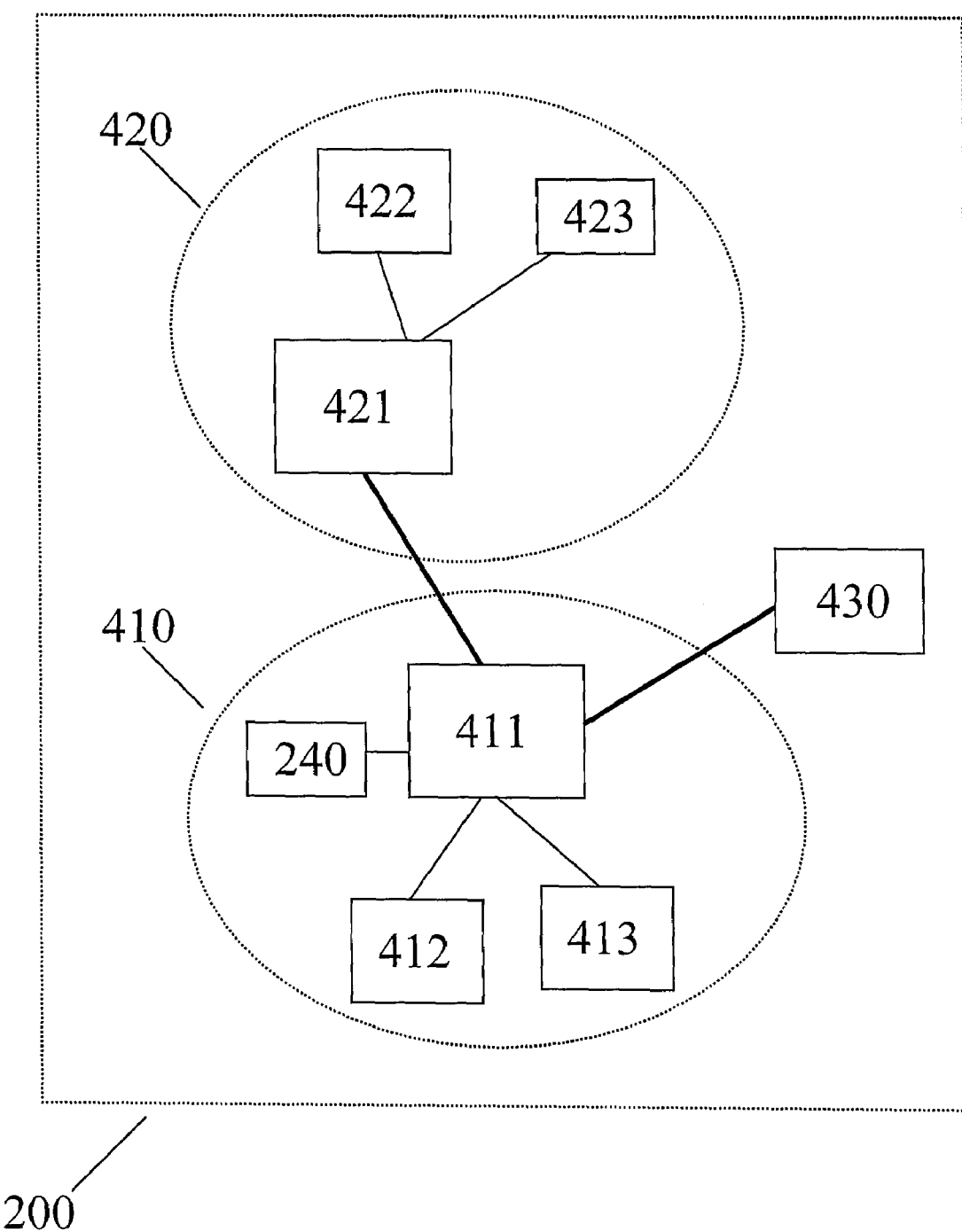
FIG. 4 is a schematic view illustrating the connectivity of the verification apparatus of FIG. 2.

The invention is now described in more detail with reference to FIGS. 1–4. A signature apparatus 300 of FIG. 3 is used to generate and place digital encoded signatures on hardcopy documents such as checks. A verification apparatus 200 of FIG. 2 is used to verify the digital signatures placed on the hardcopy documents. FIGS. 1 and 4 show various practical options for utilizing the verification apparatus 200 and the signature apparatus 300 of FIGS. 2 and 3. Many of the descriptions below assume the system is used with checks, but the invention is in no way limited to checks and can be applied to many types of hardcopy documents.

Figure 5:
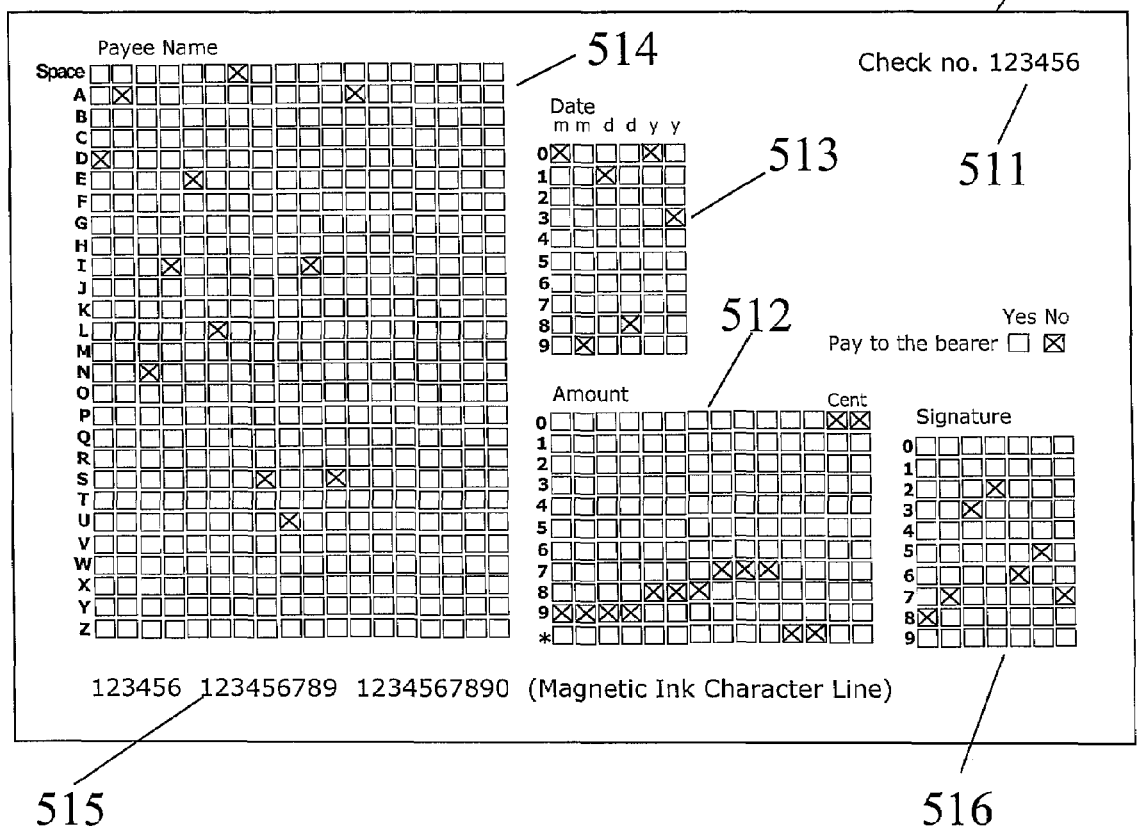

The present invention associates encoded signatures with hardcopy documents such as the checks 510, 610 and 710 of FIGS. 5–7. The checks include check data (or "document data" when the invention is applied to other types of documents in addition to checks) required to be placed on (or in general associated with) the check. The check data can include alphanumeric data such as the check amount, the check date and the payee name. The check data can in general be in human and/or machine readable form. Also, the check data can include identifying data including a check identification number (or in general a "document identification number"), customer account number and a bank routing number which are typically included in a machine-readable MICR (Magnetic Ink Character) Line, as understood in the art. The check identification number (in general "document identification data"), which is normally a check serial number, is usually pre-printed on the check and is read by the customer or automatically recognized when generating a check signature (or in general a document signature).

The signature apparatus 300 of FIG. 3 stores a signor key associated with a signor of the hardcopy document in a secret key file 330. Here the signor can be anyone using the signature apparatus 300 for generating an encoded signature. The Signor key can be associated with one signor or can be associated with a group of signors.

The signature apparatus 300 optionally stores identifying information corresponding to the check such as the customer account number and the bank routing number in a file (not shown), which can be used to generate the signature. This identifying information corresponds to the signor key in the file 330. The identifying information can be optionally be stored in the file 330 together with the signor key.

The check data (or in general "document data") required to be written on the hardcopy document is ether manually or automatically input into the signature apparatus 300. An encoded document signature is then generated using the signor key along with the check data, including the document identification number. The encoded document signature is next associated with the hardcopy document, either by printing or some other means.

The signature apparatus 300 also generates a data indicator indicating which of the check data is used to generate the signature. The data indicator, like the signature, is associated with the hardcopy document. The data indicator is particularly useful when the signature apparatus 300 changes the items selected from the check data used to generate the signature. The signor of the check can make the decision about which items selected from the check data are to be used to generate the signature. For example, in the generation of some signatures the check identification number and the check amount are used, while the check identification number along with the check date and the payee name are used to generate other signatures. The data indicator is then used to allow the verification apparatus 200 to determine the check data which is represented in the signature.

The verification apparatus 200 receives the hardcopy document along with its associated signature and the data indicator. The verification apparatus 200 recognizes the check data written on the hardcopy document. This recognition can be done manually by a person reading the check data from the hardcopy document and providing the data for the verification process. Alternatively, the verification apparatus 200 can perform automatic recognition of the data written on the hardcopy document using OCR (Optical Character Recognition) or OMR (Optical Mark Recognition) in combination with the MICR, for example. When a symmetric cryptosystem such as DES is used, the recognized check data is used along with a verification key associated with the signor stored in a database of secret keys 230 to perform a comparison with data within the signature. This comparison can be performed by using the recognized check data including the check identification number, with the verification key associated with the signor to generate a verification signature using a signature program 210. The data indicator indicates to the verification apparatus 200 which of the recognized check data to use to generate the verification signature. A comparison of the verification signature with the document signature is then performed to verify the signature by determining if the document signature associated with the hardcopy document was generated using the signor key and the check data. The signature program 210, the signature verification program 220 and the database of secret keys 230 can all be stored on a verification server 240.

Alternatively, when an asymmetric cryptosystem such as RSA is used, the document signature can be decoded using the verification key. The data indicator indicates which of the recognized check data to use to compare with the decoded document signature. A comparison is then performed to verify the document signature.

Note that the verification key can be the same as or different from the signor key. When a symmetric cryptosystem such as DES is used, the signor key is identical to the verification key. On the other hand, when an asymmetric cryptosystem such as RSA is used, a private key is paired with a public key, and the two keys are different. The private key can serve as the signor key and the public key can serve as the verification key.

Including in a check signature the customer account number and the bank routing number from the MICR data can be very useful. For example, in one embodiment the RSA algorithm is used to encrypt check data using a signor key (in this case a private key) to generate the check signature. A verification key (in this case a public key) is shared among several banks. It is possible for a customer who has checking accounts at more than one bank to obtain checks having the same check numbers from two different banks, bankA and bankB. In this situation it is possible for a check from bankA to be verified by bankB using the public key, and thus bankB can mistakenly honor the check of bankA. By using the account# and routing number in the signature, such a possible mistake is prevented. Even if the account number is the same, the routing number will be unique. Additionally, for international settlement, a country code may be used and can be added to the routing number.

FIG. 3 is now explained in more detail. For convenience, the signature apparatus 300 is described for the case in which the hardcopy documents are checks requiring verification by a bank, but the invention is not limited to such uses. In this example, the personal signature apparatus 300 can be, for example, a modified cellular phone, a PDA (Personal Digital Assistant) or a personal computer. For a corporate user, the signature apparatus can be a larger computer system. The signature apparatus 300 includes an input module 350 for receiving the input of check data, including a check identification number (typically called the "check number"), required to be written on a check from a user ("signor") such as a customer or other person who is signing the check. The input module 350 can include a keypad whereby the user enters the check data by reading it from the check and/or by entering check data that will later be associated with the check. Alternatively, the input module 350 can receive from the user the check already having the required check data written thereon and then use scanning and OCR to extract the check data, including the check identification number, directly.

The signature apparatus 300 also includes a key management program 320 for managing secret signor keys stored in a secret key file 330. Preferably the secret key file 330 can accommodate more than one signor key if the customer has accounts at several different banks. Access to the secret keys can be given in response to the authentication of biometric data input from a biometric sensor/input module 360. Preferably the biometric data is fingerprint data and the biometric sensor/input module 360 includes a fingerprint sensor.

A signature generation program 310, inputs the preprinted check identification number, the check data which was entered into the input module 350, and a secret signor key from the secret key file 330 into an encoding algorithm or encryption algorithm, such as "DES" or "RSA" to generate a digital signature.

The signature generation program 310 preferably requires the user to first authenticate himself by inputting the fingerprint data before the program can gain access to the secret key file 330. Authentication of the user can be performed using a PIN or password instead of or in addition to fingerprint authentication. The signature generation program 310 displays the generated signature on a display module 340. A data indicator sub-program 315 produces a data indicator indicating which of the check data required to be written on the check is included in the generation of the signature.

A printer module 370 is used for printing the signature and the data indicator for association with the check. The printer module 370 can print the signature and the data indicator to a sticker for sticking on the check or can print the signature directly onto the check. The printer module 370 can also print the information required to be written on the check such as the check amount, the check date and the payee name. Alternatively, this information might already be written on the check. When printing directly on the check, the check is preferably inserted into an insert slot 380 and then passes towards the right to exit from the exit slot 385. A sensor may be used to align the check in the proper position prior to printing.

Typically, the secret signor key is initially issued by a bank. Upon obtaining the signor key, the customer inputs the Signor key into the signature apparatus 300 via the key management program 320. The Signor key is securely stored in the secret file 330 and is preferably accessed by means of the biometric data to enhance the security as described above. Periodically, a new secret signor key can be issued by the bank or alternatively, a customer can change the signor key through an automated teller machine in a similar fashion to changing an ATM PIN (personal identification number). The process should be facilitated with proper security means, and then the new signor key replaces the old signor key in the database 230 of the verification apparatus 200 (see FIG. 2). The DES cryptosystem which typically exists within an ATM may be used to facilitate such a scheme. Accordingly, the new signor key is input into the signature apparatus 300 via input module 350, to be stored in the secret key file 330 and replaces the old signor key by means of the key management program 320. The process of updating the secret key file 330 is preferably done using the biometric information.

The data indicator produced by the data indicator subprogram 315 is now described in more detail. The data indicator is defined to indicate which of the data required to be written on the document is used in generating the signature. There are many embodiments for the exact form taken by the data indicator. There are also many embodiments for the location of the data indicator and method of association of the data indicator relative to the hardcopy document. In one embodiment, the data indicator is a numerical character representation embedded within the signature. There are many ways in which the data indicator can be embedded within the signature. For example, it may be put at the front or at the end of the signature, or it may also be positioned within the signature based on a certain digit of the check number, etc. When positioned within the signature, the data indicator appears to be part of the signature. The data indicator can alternatively be appended to the document data before being encrypted as the document signature. This scheme can be applied with the embodiment shown in FIG. 9C, where the data indicator is not required to be placed within the document signature. Rather, the data indicator is recovered when the document signature is decoded. After the data indicator is recovered, it can then be used to select the document data recognized from the received hardcopy document before the comparison step is performed.

The following describes one embodiment for generating the data indicator. The check number is an essential part of almost all checks and is almost always pre-printed on checks. Typical check data required to be written on the check includes the check number as well as the check amount, the check date and the payee name. Often, all of this information is available and used to generate a signature. However, sometimes some of check data is not known or written to the check until after the signature is generated. Sometimes some of the check data is left to be filled in by the payee or the recipient of the check at a later time before the check is submitted for settlement. Sometimes the signor decides to only include critical check data such as the check amount, but still desires to protect the money in his account.

In one embodiment a binary system is used to define the data indicator. The check number is assigned a value of 0 (always present), the presence of a check amount is assigned a value of 1 otherwise 0, the presence of a check date is assigned a value of 2 otherwise 0 and the presence of a payee name is assigned a value of 4 otherwise 0. The value of data indicator is obtained by adding up all values presented. The assignments of the values are merely illustrative. Other values can be used instead.

Several illustrative examples of this system for generating a data indicator are provided. If the check number, the amount, and the payee name are used in generating a signature, then the data indicator is defined to be 5 (0+1+4=5). Here the check number is represented by numeral 0, the amount is represented by numeral 1, and the payee name is represented by numeral 4. Therefore, based on the above value assignment, the data indicator can take on the following values representing different information required to be written on the check: value 0 indicates that only the check number is used in generating the signature; value 1 indicates that the check number and the check amount are used in generating the signature; value 2 indicates that the check number and the date are used in generating the signature; value 3 indicates that the check number, the amount and the date are used in generating the signature; 4 indicates that the check number and the payee name are used; 5 indicates that the check number, the amount and the payee name are used; 6 indicates that the check number, the date and the payee name are used; and the value "7" indicates that the check number, the amount, the date and the payee name are used in generating the signature.

A bearer indicator can optionally be defined to indicate whether or not the bearer of the check (a person who is bearing the check), who can be different from the payee indicated on the check, is allowed to cash or clear the check. A bearer indicator can be defined using a single character representation such as a "Y" and an "N" or a numerical character representation such as "1" and a "0". "Y" or "1" indicates that the bearer of the check is allowed to clear the check and "N" or "0" indicates that the bearer is not allowed to clear the check. Of course other bearer indictors can be used as well. The bearer indicator can be embedded within the document signature in the same manner as is the data indicator as described above. Alternatively, the bearer indicator can be appended to the document data before being encrypted to create the document signature as described above with reference to FIG. 9B.

The verification apparatus 200 is now described in more detail with reference to FIG. 2. The verification apparatus 200 can be implemented on a verification server 240. The verification of the signature is automatically done using the computer-based verification apparatus 200 configured with a means for verifying a digital signature. The apparatus can include the verification server 240, a host computer (not shown), and other systems and devices for acquiring the required data from the hardcopy documents. Preferably the verification server and host computer are located within the central computing facility of the issuing bank. The verification server 240 of the present invention comprises a signature program 210 which can contain an encryption algorithm such as DES or RSA. The signature program 210 can obtain as input document data read from a hardcopy document and then produces a digital document signature. The signature program 210 can also obtain as input a digital document signature read from a hardcopy document and then produce recovered document data. A signature verification program 220 verifies the signature generated by program 210 against the signature read from the document and also verifies the recovered document data generated by the signature program 210 against the data read from the document. A database 230 of customers' secret verification keys is preferably stored in a secure way using an encrypted format and the keys are decrypted back to their original forms prior to being used.

Figure 8:
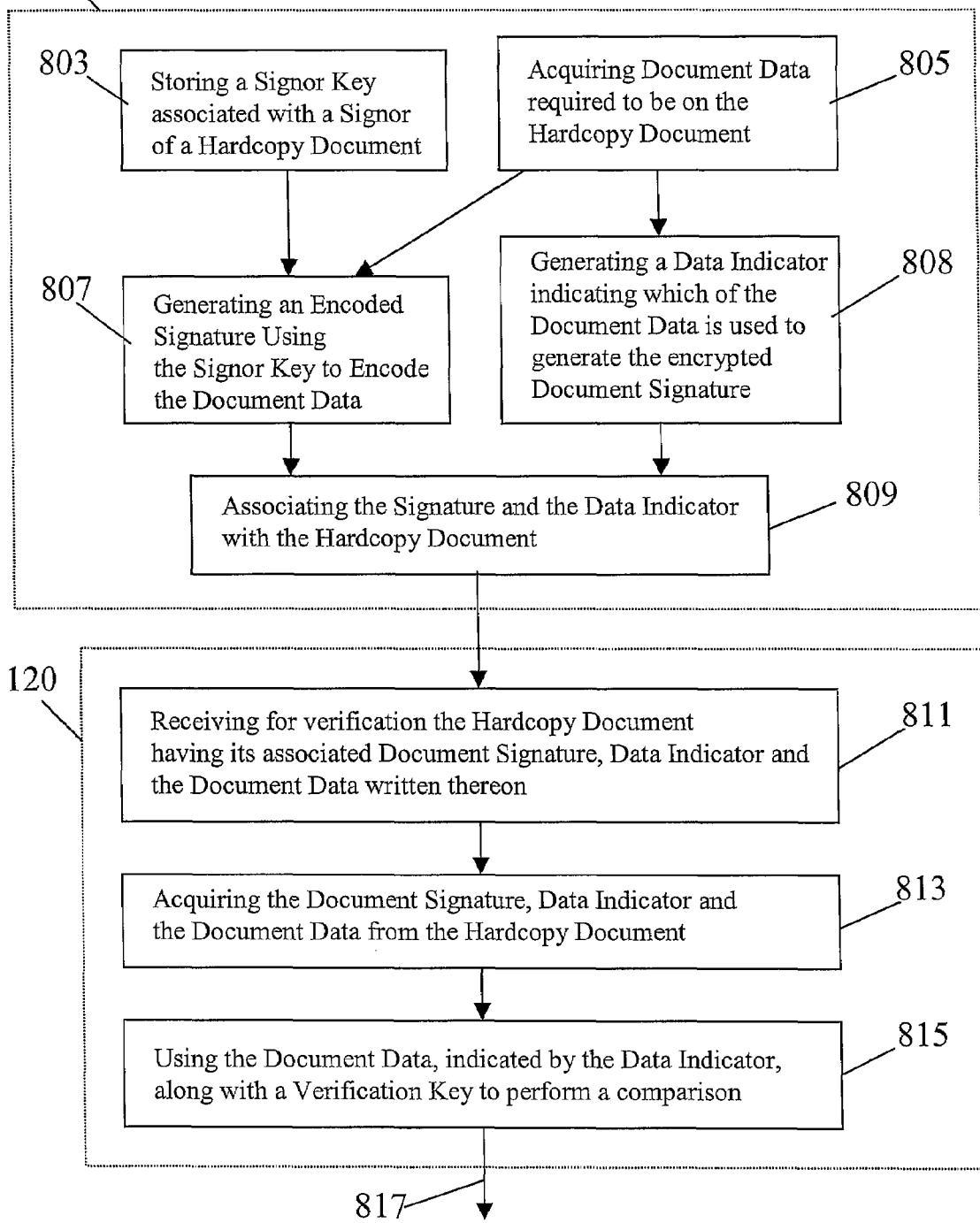
FIG. 8 is a flow chart illustrating the method of the present invention.

FIG. 8 illustrates the general method of the present invention. For descriptive purposes, the method can be divided into two sets of steps. The signature is generated and associated with the hardcopy document during signature generation and association steps 110. The hardcopy document is verified during verification steps 120. Once again, the method can be used with any hardcopy documents, including checks. For checks, the verification steps 120 can occur during the settlement stage of check processing.

During the signature generation and association steps 110, the signature apparatus 300 of FIG. 3 stores the signor key associated with a signor of the hardcopy document at step 803 (new signor keys are periodically be input into the secret key file 330). It also acquires document data, including document identification data, required to be associated with the hardcopy document at step 805. The document data can be acquired manually through input by the signor, for example, or can be obtained automatically by scanning and recognizing the data if already written on the hardcopy document. At step 807 an encoded document signature is generated using the signor key to encode the document data. At step 808 a data indicator is generated indicating which document data required to be associated with the hardcopy document is used to generate the signature. At step 809 the signature, along with the data indicator, is associated with the hardcopy document, for example by printing the signature directly on the document or else by printing it on a sticker to be placed on the document.

During the verification steps 120, at step 811 the verification apparatus 200 of FIG. 2 receives the hardcopy document having its document signature, data indicator and the document data, including the document identification data, associated therewith. When the hardcopy document is a check, for example, the verification apparatus typically receives the hardcopy document at the payee bank, issuing bank or at an ATM machine. However, the hardcopy document can also be received by the verification apparatus 200 at the location of the signor, payee, or other locations. In such cases the verification apparatus 200 is defined as extending to those other locations. At step 813 the document signature, the data indicator and the document data, including document identification data, are acquired by the verification apparatus 200. As in step 805, the these items can be acquired manually through input by a person, for example, or can be obtained automatically by scanning and recognizing these items on the hardcopy document.

At step 815 a verification step is performed whereby the acquired document data, including document identification data, is used along with a verification key to determine whether the document signature was generated using the signor key and the document data indicated by the data indicator. This step can be performed in several different ways. When a symmetric encoding algorithm such as DES is used, a verification signature is generated using the document data indicated by the data indicator, along with the document identification data and a verification key identical to the signor key. The verification signature is then compared to the document signature acquired from the document at step 813. Alternatively, the document signature acquired at step 813 can be decoded to recover the document data and the recovered document data is compared to the document data indicated by the data indicator. Both symmetric and asymmetric cryptosystems can be applied with this scheme.

Finally, at step 817 the verification result is output to indicate whether the document signature associated with the hardcopy document was generated using the signor key and the document data.

Several different examples of the verification of signatures on checks of the present invention are now described with respect to FIG. 1. Particular examples of signature generation and association steps 110 combined with verification steps 120 are presented, but it will be clear to one skilled in the art that any of these steps 110 can be combined with any of these steps 120 with minor modifications.

Turning first to an embodiment 111 of FIG. 1, as part of the signature generation and association steps 110 a check is prepared for use with OMR (Optical Mark Recognition) or enhanced OMR such as IMR. Specific locations on the check are pre-printed in a special formation to form the optical mark scanning zones. Specific required data is put on the check by marking these pre-defined positions designated for this data. The OMR reader looks for dark marks in these pre-defined positions. The presence of a mark at a pre-defined position indicates the presence of a piece of data designated for this position. OMR is a proven data collection technology generally used for standardized tests, enrollments, surveys and other massive data collection activities. The check can be prepared with rectangular marking spots to be filled with 'X' marks. Forms, such as those having circular marking spots to be filled with bubble marks or other designs readable by OMR/IMR are applicable as well.

The length of the signature in this example is 6 characters. The required data to be used for generating the signature is the check number, the amount, the date and the payee name. Therefore, the value of the data indicator is "7" (0+1+2+4). The data indicator is appended to the end of the signature so that the length of the signature becomes 7 numeric characters.

FIG. 5 provides an example of a check 510 having the required data and a signature according to the embodiment 111. A signor, for example a customer, writes an amount 512, a date 513 and a payee name 514 by marking the pre-defined positions on the check. Referring again to FIG. 3, the customer invokes the signature generation program 310, inputs a check number 511, the check amount, the date and the payee name into the signature apparatus 300 via the input module 350. The customer also inputs his/her fingerprint via the biometric sensor module 360 to activate the generation of a signature. The signature generation program 310 then generates a digital signature based on the input data using the customer's secret key pre-stored in the secret key file 330. Preferably, every non-numeric character of the generated signature is converted to a numeric character through a decimalization process as known in the art. Based on the input data, the data indicator sub-program 315 produces a data indicator having a value of "7". The program 310 then takes the first 6 digits of the generated signature and appends the data indicator to this 6-digit code to produce a 7-digit signature code. The display module 340 then displays the 7-digit signature. Next the customer marks down the displayed signature onto the pre-defined positions 516 on the check 510. The check illustrated in FIG. 5 is for an amount of $9,999,888,777.00, has a date of Sep. 18, 2003, has a payee name "Daniel Suisa", and has a 7 digit signature 8732657, where the last digit "7" is the data indicator.

Next the verification steps 120 for an embodiment 121 of FIG. 1 are described with additional reference to FIG. 4. FIG. 4 shows the connectivity of the verification apparatus 200. The check 510 is presented to a branch office 422 of a payee bank 420 for settlement. A check reading device of the verification apparatus 200 is configured with OMR and MICR which can be implemented within the teller system in the branch 422. The check reading device provides the read data to a host computer 421 of the payee bank 420. The host computer 421 can be connected to a host computer 411 of an issuing bank 410 via an inter-bank connection between the payee bank 420 and the issuing bank 410. The verification server 240 includes the program 210 for generating the signature (preferably a numeric digital signature), the signature verification program 220 for verifying the generated signature against the signature read from the check and the database 230 of customers' secret verification keys. The verification server 240 can be part of the issuing bank host computer 411 or can be separate. The check reading device reads all necessary information from the check 510. The optical mark scan zone, including the signature 516, the amount 512, the date 513 and the payee name 514 are automatically read by the OMR. Also, the magnetic ink character line 515 is automatically read by the MICR. The signature and the information read from the check are then transmitted to the verification server 240. Having received the information, and referring to the data indicator taken from the last digit of the signature, wherein the data indicator is decoded to be 0, 1, 2 and 4 (7=0+1+2+4), the signature program 210 then takes the check number, the amount, the date and the payee name as input and generates a digital verification signature using the customer's secret key pre-stored in the database 230. Taking the first 6 digits of the signature generated by program 210, the signature verification program 220 verifies it against the first 6 digits of the signature read from the check. The check 510 can therefore be settled automatically.

Turning now to an embodiment 112 of FIG. 1, as part of the signature generation and association steps 110, the signature apparatus 300 of FIG. 3 generates and "prints" the signature and the data indicator on a label (sticker). The printed label/sticker is associated with the check by "affixing" it to the check. The data required to be written on the check itself can also be printed on the same label as the signature. The affixed label can then be automatically read by OCR. The check can be presented to and settled at an ATM of the payee bank. FIG. 6A shows a check 610 of the embodiment 112 before being filled-in and FIG. 6B shows the check 610 after being filled-in.

The length of the signature in this example is 10 characters. The data to be used for generating the signature includes the check number 611, the amount and the date. The data indicator therefore takes a value of "3" and is appended at the end of the signature to make the length of the signature 11 characters.

The customer invokes the signature generation program 310 residing in the signature apparatus 300 (see FIG. 3) and also inputs the check number 611, the amount and the date into the signature apparatus 300 via the input module 350. Next the customer inputs his/her fingerprint via the biometric sensor module 360 to activate the generation of a signature. The signature generation program 310 then uses the customer's secret key pre-stored in the secret key file 330 to generate a digital document signature based on the input data. Also, based on the input data, the data indicator sub-program 315 produces the data indicator having the value of "3". The program 310 then takes the first 10 digits of the generated signature and appends the resultant data indicator to this 10-digit code, resulting in an 11-digit signature code. The printer module 370 then prints the 11-digit signature together with the date and the amount on a sticker/label 613. The printed sticker/label 613 is then affixed to a designated position 612 on the check 610 (FIGS. 6A and 6B). In this example the payee name is left blank and it is up to the recipient of the check to fill it in.

Next the verification steps 120 for an embodiment 122 of FIG. 1 are described with reference to FIG. 4. The check 610 is presented to an ATM (automated teller machine) 423 of the payee bank 420 for settlement. The ATM 423 is configured with means for accepting a check and reading the optical character scan lines and the magnetic ink character line from the check. The ATM 423 can be connected to the verification server 240 through an interbank connection between the host computer 421 of the payee bank 420 and the host computer 411 of the issuing bank 410. The process is generally initiated by inserting an ATM card into the ATM 423. An authentication procedure is then performed and the desired transaction is selected from a selection menu. Following a prompt from the ATM 423, the check 610 is inserted by the payee into the ATM 423. The ATM 423 then reads the information in the optical character scan lines 613 and the magnetic ink character line 614 of the check 610. Since the payee name on the check is non-machine readable information, if allowed, the ATM can automatically take the name from the system referenced by the payee ATM card. Alternatively, the payee can be prompted to key in his/her name manually.

Next, the signature and the information read from the check as well as other required information are transmitted to the verification server 240. Having received the information, and referring to data indicator taken from the last digit of the signature, the signature program 210 then takes the check number, the amount and the date as input and generates a digital signature using the customer's secret key pre-stored in the database 230. Taking the first 10 digits of the signature generated by program 210, the signature verification program 220 verifies it against the first 10 digits of the signature read from the check 610. The check 610 can therefore be settled automatically.

Next an embodiment 113 of FIG. 1 is described as part of the signature generation and association steps 110, wherein the signature, the data indicator and the required data are printed by the printer module 370 of the signature apparatus 300 directly onto the check. The check is written to a payee, who can be an individual, a retailer, a shop, or the like.

FIG. 7A shows the check 710 of the embodiment 113 before being filled-in and FIG. 7B shows the check 710 after being filled-in. The length of the signature in this example is 10 characters. The data used for generating the signature are the check number, the amount, the date and the payee name. The data indicator is therefore "7" and is appended at the end of the signature.

Referring also to FIG. 3, a customer invokes the signature generation program 310 residing in the signature apparatus 300. The customer inputs the check number 711, the amount, the date and the payee name into signature apparatus 300 via the input module 350. The customer inputs his/her fingerprint via the biometric sensor module 360 to activate the generation of a signature. The signature generation program 310 then generates a digital signature based on the input data using the customer's secret key pre-stored in the secret key file 330. Based on the input data, the data indicator sub-program 315 produces a data indicator "7". The program 310 then takes the first 10 digits of the generated signature and appends the resultant data indicator which results in an 11-digit signature code. The program 310 then prompts the customer to insert the check 710 into the printing insert slot 380 and upon insertion of the check, the program 310 directly prints the 11-digit signature and the data to their designated positions on the check 710 as shown in FIG. 7B.

When a payee 430 (see FIG. 4) receives the check 710, he can immediately get a confirmation on the authenticity of the check and the customer as well as the solvency of the customer account on which the check is written, as illustrated by the verification steps 120 for an embodiment 123 of FIG. 1. The process may be done through a call center, a phone banking, a mobile banking, an internet banking, or a special defined system installed at the payee location which can be connected to the verification server 240 through the host computer 411 of the issuing bank 410. The information on the check can either be read automatically or manually. In the case of automatic reading, a pre-installed check reading device configured with OCR and MICR at the location of the payee 430 reads the optical character scan lines and the magnetic ink character line of the check 710, and communicates this information to the verification server 240. In the case of manual reading, the payee 430 manually reads the information from the check 710 and responds to the system based on a pre-defined dialog/protocol.

After receipt of the information and verification of the signature by the verification server 240, the issuing bank host computer 411 performs the following functions. The associated drawer's account is placed "on hold" for the sum of the amount of the check in favor of the payee 430 and authorization notification is signaled to the payee 430. The check settlement is completed when the check 710 is physically presented to and re-verified by the issuing bank 410. The check 710 may additionally or alternatively be presented to the payee bank.

Next the verification steps 120 for an embodiment 124 of FIG. 1 are described with reference to FIG. 4. In this embodiment the automatic verification of the signatures is performed on a batch of checks collected from several sources such as large retailers, utility companies, or the like. The checks can be processed at the issuing bank's processing center 412, wherein the processing center can be a regional processing center, a branch office, or other designated locations. A check reading system capable of processing a batch of checks is installed at the processing center 412 and used to read the checks. The check reading system can be connected to the verification server 240 through the issuing bank host computer 411.

An embodiment 114 is now described as part of the signature generation and association steps 110. In this embodiment the signature apparatus 300 of FIG. 3 generates a signature but is unable to print the generated signature onto the check due to a printer problem, or the lack of a printer. The customer instead writes down the "displayed" signature, data indicator and all necessary information onto the check manually by hand, using a pen (or other traditional writing instrument).

Next the verification steps 120 for an embodiment 125 of FIG. 1 are described with reference to FIG. 4. This embodiment provides automatic verification of a signature on a check written manually, and is particularly useful with the embodiment 114. The check is presented by the payee to a branch office 413 of the issuing bank 410. A check reading device can be installed within the teller system in the branch 413 and can be connected to the verification server 240 through the issuing bank host computer 411. The teller treats the check as usual by submitting it to the check reading device. The check reading device can read the MICR line but is unable to read the handwritten digital signature and the handwritten information on the check. The teller system therefore prompts the teller to enter the non-machine readable information and the teller manually reads the handwritten information including the signature from the check and keys them into the teller system. After entering the information, the information is transmitted to the verification server 240 where the rest of the verification process is performed automatically. A system with handwritten character recognition capability may be used to improve the speed of the process by reducing the work of the teller.

The following provides an example of an embodiment of the present invention using an asymmetric cryptosystem such as RSA which is well known in the art. The RSA algorithm employs a secret key uniquely assigned to a customer. The secret key has a private component and a public component, which are generally known as the private key and the public key, respectively. Data is encoded using the private key. Later the data is recovered by decoding the encoded data using the public key. Based on this scheme, the private key can serve as the signor key and the public key can serve as the verification key.

An embodiment of the present invention using the RSA algorithm is described with reference to FIG. 2. In this embodiment the signature program 210 contains an RSA algorithm for decoding the signature read from the check. The signature verification program 220 then compares the decoded signature with the document data read from the check. The database 230 contains public keys for the customers. Alternatively, the public keys can be obtained from an external source such as an authorized third party.

Referring to FIG. 3, the signature generation program 310 can contain an RSA algorithm for producing an encoded document signature. In this case the secret key file 330 contains private key(s) of customers.

When a signature is needed for a check, a digital signature is generated, by the customer, using the signature apparatus, based on the specific data input to the input module 350 of the signature apparatus 300 and the customer's private key. The private key is preferably pre-stored in a secure way inside the secret key file 330 of the signature apparatus 300. A data indicator is also generated indicating which of the data is used to generate the signature. The generated signature, the data indicator, and the data are associated with the check.

When the check is presented to the bank for settlement, the signature and all necessary information from the check are read and communicated to the verification apparatus 200. Having received the information, the verification apparatus 200 decodes the signature read from the check using the customer's public key and verifies the decoded signature against the information read from the check specified by the data indicator.

The following provides an example of the use of the invention with a hard-copy document other than a check. This example describes an embodiment of the present invention for transferring funds from a person-A at bank-A to a person-B at bank-B. Bank-A and bank-B have an online inter-bank connection. Using a machine-readable fund transfer form provided by bank-A, person-A generates a digital signature based on the form identification number combined with information required to be written on the form and a personal secret key of person-A. The required information can be the amount of the funds to be transferred, the date, the destination information to which the fund is transferred and the source information from which the fund is transferred. The destination information can be the name of person-B, the account number of person-B, and the code and/or name of bank-B. The source information can be the name of person-A, the account number of person-A, and the code and/or name of bank-A. The generated signature and the required information are associated with the transfer form. Then, person-A executes the fund transfer process by, in this example, submitting the filled transfer form to an ATM, which is capable of accepting the form and reading the information from the form. Having read the signature and the required information including the form identification number from the submitted form, the ATM transmits such information to the host system where the signature is verified automatically as described above in relation to checks. The transaction can therefore be approved automatically.

The present invention may be embodied in other forms without departing from its spirit and scope. The embodiments described above are therefore illustrative and not restrictive, since the scope of the invention is determined by the appended claims rather then by the foregoing description, and all changes that fall within the meaning and range of equivalency of the claims are to be embraced within their scope.

The invention claimed is:

1. A system for generating and verifying signatures on hardcopy documents comprising:
   a signor key associated with a signor of a hardcopy document;
   document data required to be on the hardcopy document;
   a signature generation apparatus for generating a document signature using the signor key to encode data selected from the document data, and which is then associated with the hardcopy document;
   a data indicator associated with the hardcopy document and indicating which of the document data is used to generate the document signature;
   a verification apparatus for receiving the hardcopy document having the document data thereon, the document signature, and the associated data indicator, and performing a comparison to determine whether the document signature was generated using the signor key and the document data indicated by the data indicator; and
   an output section for outputting an indication, based on the results of the comparison, of whether the document signature was generated using the signor key and the document data indicated by the data indicator.

2. The system of claim 1, wherein the comparison is between the document signature and a verification signature generated using a verification key to encode data selected according to the data indicator from the document data on the received hardcopy document.

3. The system of claim 2, wherein the signor key and verification key are substantially identical and the encoding of the document data is performed using a symmetric cryptosystem such as DES.

4. The system of claim 3, wherein the document signature is formed from a portion of a full signature generated using the signor key to encode data selected from the document data and the verification signature is formed from a portion of a full signature generated using the verification key to encode data selected from the document data.

5. The system of claim 1, wherein the comparison is between data selected according to the data indicator from document data on the received hardcopy document and data recovered from the document signature using a verification key.

6. The system of claim 5, wherein the signor key and verification key are substantially identical and the encoding of the document data and recovery of the data from the document signature are performed using a symmetric cryptosystem such as DES.

7. The system of claim 5, wherein the signor key is a private key and the verification key is a public key and the encoding of the document data and recovery of the data from the document signature is performed using an asymmetric cryptosystem such as RSA.

8. The system of claim 1, wherein the document data required to be written on the hardcopy document includes a document identification number which is combined with the signor key to generate the document signature.

9. The system of claim 1, wherein the hardcopy document is a check.

10. The system of claim 9, further comprising a bearer indicator associated with the check indicating whether or not the bearer of the hardcopy document, who is not the payee, is allowed to clear the check.

11. The system of claim 9, wherein the document data required to be written on the check includes a check identification number which is combined with the signor key to generate the document signature.

12. The system of claim 11, wherein the document data required to be written on the check and which is combined with the signor key to generate the document signature additionally includes data selected from the set consisting of: a check amount, a check date, a payee name, a signor account number and a bank routing number.

13. The system of claim 12, wherein the data indicator printed on the check indicates which of the check amount, check date and payee name are used to generate the document signature.

14. The system of claim 1, further comprising at least one printer for printing the document signature and wherein the document signature is associated with the hardcopy document by placing the printed signature on the hardcopy document.

15. The system of claim 1, wherein the document signature is comprised of a series of characters.

16. The system of claim 15, wherein at least one of the document signature characters is the data indicator indicating which of the document data is used to generate the signature.

17. The system of claim 1, further comprising a portable hand-carryable housing enclosing:
   a memory storage device for storing the signor key;
   an input device for receiving the document data and storing it in the memory storage device;
   a processor for retrieving the signor key and document data from the memory storage and generating the document signature by encoding the document data using the signor key; and
   an output device for outputting the document signature.

18. The system of claim 17, further comprising a biometric sensor connected to the housing and providing biometric information of the signor for accessing the signor key.

19. The system of claim 17, wherein the output device is a printer.

20. The system of claim 17, wherein the input device allows the signor to manually input at least a portion of the document data.

21. The system of claim 1, wherein the document signature is associated with the hardcopy document by marking the document signature on the document and the verification apparatus reads the associated signature on the hardcopy document using optical mark recognition.

22. The system of claim 1, wherein the signature is associated with the hardcopy document by printing the signature on a sticker and sticking the sticker on the document.

23. The system of claim 1, wherein the signor manually inputs into the system the document data required to be written on the hardcopy document, the system further comprising a printer for printing the document data and the signature directly on the hardcopy document.

24. The system of claim 1, wherein the system displays the document signature and the signor manually writes characters forming the displayed document signature onto the hardcopy document.

25. The system of claim 9, wherein the verification apparatus comprises:
   a payee bank for receiving the check having the associated signature; and
   an inter-bank connection for forwarding the document data and information contained in the document signature to a bank computer system for determining whether the signature was generated using the signor key and the document data to thereby verify the document signature.

26. The system of claim 9, wherein the verification apparatus comprises:
   an automated teller machine for receiving the check and reading the document data and document signature associated therewith; and a connection for forwarding the read document data and document signature to a bank computer system for determining whether the document signature was generated using the signor key and the document data to thereby verify the document signature.

27. The system of claim 9, wherein the verification apparatus comprises:
an Internet banking system for acquiring the document data and document signature associated therewith and for forwarding the document data and document signature to a bank computer system for determining whether the signature was generated using the signor key and the document data to thereby verify the document signature.

28. The system of claim 9, wherein the verification apparatus comprises:
a telephone banking system for acquiring the document data and document signature associated therewith and for forwarding the document data and signature to a bank host computer system for determining whether the document signature was generated using the signor key and the document data to thereby verify the document signature.

29. The system of claim 9, wherein the verification apparatus comprises:
a payee section located at the location of a payee of the check for acquiring the document data and document signature with the check and for forwarding the document data and signature to a bank host computer system for determining whether the signature was generated using the signor key and the document data to thereby verify the document signature.

30. The system of claim 1, wherein access to the signor key is controlled using biometric information of the signor.

31. The system of claim 1, wherein the document is a fund transfer form used to transfer money.

32. The system of claim 9, wherein the verification apparatus comprises: a mobile banking system for acquiring the document data and document signature and for forwarding the document data and document signature to a bank computer system for determining whether the signature was generated using the signor key and the document data to thereby verify the document signature.

33. The system of claim 1, wherein the signature generation apparatus includes first and second signature generation parts and wherein:
the first signature generation part generates an intermediate document signature using the signor key to encode data selected from the document data; and
the second signature generation part generates the document signature using a second signor key to encode the intermediate document signature and data indicator.

34. The system of claim 33, wherein the verification apparatus includes:
a decoding section using a verification key to decode the document signature to produce the intermediate document signature and the data indicator;
an encoding section using a second verification key for encoding the document data from the received hardcopy document indicated by the data indicator to generate a verification intermediate document signature; and
a comparison section for performing the comparison by comparing the decoded intermediate document signature to the verification intermediate document signature.

35. A method for generating and verifying signatures on hardcopy documents comprising the steps of:
storing a signor key associated with a signor of a hardcopy document;
acquiring document data required to be written on the hardcopy document;
generating a document signature using the Signor key to encode data selected from the document data;
generating a data indicator indicating which of the document data is used to generate the document signature;
associating the document signature and data indicator with the hardcopy document;
receiving for verification the hardcopy document having its associated document signature, data indicator and document data written thereon;
performing a comparison to determine whether the document signature was generated using the signor key and the document data indicated by the data indicator; and
outputting an indication, based on the results of the comparison, of whether the document signature was generated using the signor key and the document data indicated by the data indicator.

36. The method of claim 35, wherein the comparison is between the document signature and a verification signature generated using a verification key to encode data selected according to the data indicator from the document data on the received hardcopy document.

37. The method of claim 36, wherein the signor key and verification key are substantially identical and the encoding of the document data is performed using a symmetric cryptosystem such as DES.

38. The method of claim 37, wherein the document signature is formed from a portion of a full signature generated using the signor key to encode data selected from the document data and the verification signature is formed from a portion of a full signature generated using the verification key to encode data selected from the document data.

39. The method of claim 35, wherein the comparison is between data selected according to the data indicator from document data on the received hardcopy document and data recovered from the document signature using a verification key.

40. The method of claim 39, wherein the signor key and verification key are substantially identical and the encoding of the document data is performed using a symmetric cryptosystem such as DES.

41. The method of claim 39, wherein the signor key is a private key and the verification key is a public key and the encoding of the document data and recovery of the data from the document signature are performed using an asymmetric cryptosystem such as RSA.

42. An apparatus for generating and placing digital signatures on checks comprising:
a signor key associated with a signor of the check;
check information required to be written on the check including a check identification number and bank routing number along with information selected from the set consisting of: a check amount, a check date and a payee name;
an encoded signature which is generated by using the signor key to encode data selected from the check information and which is then placed on the check; and
a data indicator indicating which of the check amount, the check date and the payee name are used to generate the signature.

* * * * *